United States Patent
Fujimoto

(10) Patent No.: US 7,868,084 B2
(45) Date of Patent: Jan. 11, 2011

(54) CURABLE COMPOSITION

(75) Inventor: Toyohisa Fujimoto, Takasago (JP)

(73) Assignee: Kaneka Corporation, Osaka (JP)

( * ) Notice: Subject to any disclaimer, the term of this patent is extended or adjusted under 35 U.S.C. 154(b) by 989 days.

(21) Appl. No.: 10/552,036

(22) PCT Filed: Mar. 29, 2004

(86) PCT No.: PCT/JP2004/004481

§ 371 (c)(1),
(2), (4) Date: Oct. 3, 2005

(87) PCT Pub. No.: WO2004/092270

PCT Pub. Date: Oct. 28, 2004

(65) Prior Publication Data

US 2006/0270819 A1    Nov. 30, 2006

(30) Foreign Application Priority Data

Apr. 11, 2003   (JP)   ............................. 2003-108252

(51) Int. Cl.
*C08L 71/02* (2006.01)

(52) U.S. Cl. .................. 524/588; 524/294; 524/295; 524/296; 524/306; 524/318; 524/321; 524/366; 524/378; 528/25; 528/28; 528/29; 528/31; 528/38

(58) Field of Classification Search ........................ None
See application file for complete search history.

(56) References Cited

U.S. PATENT DOCUMENTS

| | | | |
|---|---|---|---|
| 4,463,115 A | | 7/1984 | Hirose et al. |
| 5,900,458 A | | 5/1999 | Fujita et al. |
| 6,569,980 B1 * | | 5/2003 | Masaoka et al. ............... 528/27 |
| 7,151,128 B2 | | 12/2006 | Fujimoto et al. |
| 7,294,669 B2 * | | 11/2007 | Ito ............................... 524/588 |
| 7,473,441 B2 * | | 1/2009 | Iwakirii et al. ............... 427/387 |
| 2004/0188016 A1 * | | 9/2004 | Mahdi et al. .................. 156/329 |
| 2006/0128919 A1 * | | 6/2006 | Okamoto et al. .............. 528/25 |
| 2006/0251902 A1 * | | 11/2006 | Botrie et al. ............. 428/423.1 |

FOREIGN PATENT DOCUMENTS

| | | |
|---|---|---|
| CA | 2 050 899 C | 9/1991 |
| EP | 0 532 048 A1 | 3/1993 |
| EP | 0 546 310 A2 | 6/1993 |
| EP | 0 844 266 A2 | 5/1998 |
| EP | 1 403 323 A1 | 3/2004 |
| JP | 3-47825 * | 2/1991 |
| JP | 3-72527 * | 3/1991 |
| JP | 5-65403 A | 3/1993 |
| JP | 5-339490 * | 12/1993 |
| JP | 7-62217 A | 3/1995 |
| JP | 7-62218 A | 3/1995 |
| JP | 07-062218 A | 3/1995 |
| JP | 09-095609 A | 4/1997 |
| JP | 09-095619 A | 4/1997 |
| JP | 2000-129147 A | 5/2000 |
| JP | 2002-088148 A | 3/2002 |
| JP | 2002-88148 A | 3/2002 |
| JP | 2002-356613 A | 12/2002 |
| WO | WO 91/13928 A1 | 9/1991 |
| WO | WO 2004/011553 * | 2/2004 |

OTHER PUBLICATIONS

Abstract for JP 06-322251 (Nov. 1994).*
Abstract for JP 2000-143968 (May 2006).*
English language machine translation of JP 7-62218, issued Mar. 7, 1995, in the name of Asahi Glass Co Ltd.

* cited by examiner

*Primary Examiner*—Marc S Zimmer
(74) *Attorney, Agent, or Firm*—Sughrue Mion, PLLC

(57) ABSTRACT

A curable composition comprises a reactive silicon group-containing polyoxyalkylene polymer which is obtained by reacting a polyoxyalkylene polymer (A) having a molecular weight distribution of 1.6 or less, a number average molecular weight of 15,000 to 50,000, and 0.8 or more reactive groups, on average, per molecule thereof with an organic compound (B) having in the molecule thereof a reactive silicon group and a functional group capable of reacting with the reactive groups of the polymer (A) in a proportion of 0.8 to 1.5 molecules of the organic compound (B), on average, per molecule of the component (A), a filler (C) and a curing catalyst (D). The composition contains no plasticizer or a small amount of plasticizer.

12 Claims, No Drawings

CURABLE COMPOSITION

Related Application

This application is a national stage of PCT application PCT/JP2004/004481 filed on Mar. 29, 2004, claiming priority to Japanese Application No. 2003-108252 filed on Apr. 11, 2003, the contents of all of which are incorporated herein by reference.

TECHNICAL FIELD

The present invention relates to a curable composition comprising a polyoxyalkylene polymer having a silicon-containing functional group (hereinafter also referred to as "reactive silicon group") capable of crosslinking by forming a siloxane bond, a filler and a curing catalyst. The present invention also relates to a curable composition which improves the staining property of the cured product thereof, ensures mechanical properties favorable for a sealant such as low stress and high elongation, and is satisfactory in workability.

BACKGROUND ART

Reactive silicon group-containing polymers undergo crosslinking curing in the presence of moisture. Among such polymers is, for example, a curable composition which contains a polymer having a main chain skeleton formed of a polyoxypropylene, has characteristics such that it is liquid at room temperature and turns into a rubbery elastic substance by curing, and is accordingly widely used as sealants for use in building construction.

Various physical properties are demanded when curable compositions are used in building construction, and among such properties is a property that the staining around the sealing joints can be suppressed.

As one of the causes for the staining around joints, the bleeding of the plasticizers contained in the sealants may be cited. However, exclusion of the plasticizers leads to a problem that the physical properties of the cured product tend to be high in modulus and low in elongation, resulting in the quality degradation and other failures of the sealants. Also, in the case where the average number of the reactive silicon groups contained in one molecule of the polyoxyalkylene polymer is decreased for the purpose of lowering the modulus of the plasticizer-free cured product, there occurs a problem that the proportion of the unreacted polyoxyalkylene polymers having absolutely no reactive silicon groups is increased, and such polyoxyalkylene polymers cause staining around joints and other failures, similarly to the plasticizers.

For such problems, Patent Document 1 (Japanese Patent Laid-Open No. 5-65403) discloses a curable composition which includes an oxypropylene polymer, containing at least one reactive silicon group and having Mw/Mn=1.6 or less and a number average molecular weight of 6,000 or more, a filler and a curing catalyst, but does not include a plasticizer, wherein the dust adhesion of the curable composition is improved while the workability thereof is being maintained. Examples 1 and 2 of Japanese Patent Laid-Open No. 5-65403 also present curable compositions each of which includes an oxypropylene polymer, having a number average molecular weight of 10,000 and Mw/Mn=1.2 and containing approximately 2.4 reactive silicon groups in one molecule of the oxypropylene polymer, a filler and a curing catalyst, but does not include a plasticizer.

DISCLOSURE OF THE INVENTION

However, there has been a problem in that the mechanical properties of the cured product obtained from the compositions described in the aforementioned patent documents involve low elongation and other failures to degrade the quality as a sealant.

In view of the above described circumstances, the present inventors have made diligent researches, and consequently achieved the present invention by finding that a cured composition, in which the proportion between a liquid component including a particular polyoxyalkylene polymer, a filler and a curing catalyst, and also having reactive silicon groups and a liquid component having no reactive silicon groups is set to fall within a particular range, is satisfactory in workability and the cured product obtained therefrom have mechanical properties, desirable for sealant, such as low staining, low stress and high elongation.

More specifically, the present invention provides:

(1) a curable composition comprising: a reactive silicon group-containing polyoxyalkylene polymer which is obtained by reacting a polyoxyalkylene polymer (A) having a molecular weight distribution of 1.6 or less, a number average molecular weight of 15,000 to 50,000, and 0.8 or more of reactive groups, on average, per molecule thereof with an organic compound (B) having in the molecule thereof a reactive silicon group and a functional group capable of reacting with the reactive groups of the polymer (A) in a proportion of 0.8 to 1.5 molecules of the organic compound (B), on average, per molecule of the component (A); a filler (C); and a curing catalyst (D).

(2) the curable composition according to (1), in which, in the liquid components included in the curable composition described in (1), the ratio y/x of the content y (wt%) of a component having no reactive silicon groups and the content x (wt%) of a component having at least one reactive silicon group is 0.4 or less, with the proviso that x+y=100, wherein: the liquid component having no reactive silicon groups means a polyoxyalkylene polymer having no reactive silicon groups introduced when the component (A) and the component (B), both described in (1), are reacted with each other; and in the case where the curable composition described in (1) includes a plasticizer, the liquid component having no reactive silicon groups includes the plasticizer component and the polyoxyalklene polymer having no reactive silicon groups.

(3) the curable composition according to any one of (1) and (2), comprising 10 parts by weight or less of a plasticizer in relation to 100 parts by weight of the reactive silicon group-containing polyoxyalkylene polymer described in (1) or comprising no plasticizer.

(4) the curable composition according to any one of (1) to (3), in which the reactive group of the component (A) is an alkenyl group, and the component (B) is an organic compound having one hydrosilyl group per molecule thereof as a functional group capable of reacting with the component (A).

(5) the curable composition according to any one of (1) to (3), in which the reactive group of the component (A) is a hydroxyl group, and the component (B) is an organic compound having one isocyanate group per molecule thereof as a functional group capable of reacting with the component (A).

(6) the curable composition according to any one of (1) to (3), in which the reactive group of the component (A) is an isocyanate group, and the component (B) is an organic compound having one amino group per molecule thereof as a functional group capable of reacting with the component (A), and (7) the curable composition according to any one of (1) to (3), in which the reactive group of the component (A) is an alkenyl group, and the component (B) is an organic compound having one mercapto group per molecule thereof as a functional group capable of reacting with the component (A).

The curable composition of the present invention is satisfactory in workability, and the cured product obtained therefrom are satisfactory in anti-staining property and have mechanical properties, desirable for sealant, such as low stress and high elongation.

BEST MODE FOR CARRYING OUT THE INVENTION

It may be sufficient that the molecular weight distribution and the number average molecular weight of the component (A) used in the present invention are 1.6 or less and 15,000 to 50,000, respectively, the main chain structure of the polyoxyalkylene polymer having 0.8 or more reactive groups, on average, per molecule thereof is a polymer having a structure represented by —R—O— as repeating unit, wherein R is a divalent alkylene group having 1 to 20 carbon atoms. The component (A) may be either a homopolymer in which all the repeating units are the same or a copolymer in which two or more types of repeating units are included. The component (A) may have one or more branch structures in the main chain thereof.

Specific examples of R may include —$CH_2CH_2$—, —$CH(CH_3)CH_2$—, —$CH(C_2H_5)CH_2$—, —$C(CH_3)_2CH_2$— and —$CH_2CH_2CH_2CH_2$—. As R, —$CH(CH_3)CH_2$— is particularly preferable.

The main chain skeleton of the polyoxyalkylene polymer as the component (A) is obtained, for example, by ring-opening polymerization of monoepoxide in the presence of an initiator and a catalyst.

Specific examples of the initiator may include dihydric alcohols and polyhydric alcohols such as ethylene glycol, propylene glycol, butanediol, hexamethylene glycol, methallyl alcohol, bisphenol A, hydrogenated bisphenol A, neopentyl glycol, polybutadiene diol, diethylene glycol, triethylene glycol, polyethylene glycol, polypropylene glycol, polypropylene triol, polypropylene tetraol, dipropylene glycol, glycerin, trimethylolmethane, trimethylolpropane and pentaerythritol; and various oligomers having hydroxyl groups.

Specific examples of the monoepoxide may include: alkylene oxides such as ethylene oxide, propylene oxide, α-butylene oxide, β-butylene oxide, hexene oxide, cyclohexene oxide, styrene oxide and α-methylstyrene oxide; alkyl glycidyl ethers such as methyl glycidyl ether, ethyl glycidyl ether, isopropyl glycidyl ether and butyl glycidyl ether; allyl glycidyl ethers; and aryl glycidyl ethers.

As the catalyst, catalysts well known in the art may be used. Examples of such catalysts may include: alkali catalysts such as KOH, NaOH and CsOH; acidic catalysts such as trifluoroborane-etherate; alumino-porphyrin metal complexes; and double metal cyanide complex catalysts such as zinc cobalt cyanide-glyme complex catalyst. Particularly, the use of the double metal cyanide complex catalysts which scarcely cause side reactions is preferable because the Mw/Mn values of the products are small and the viscosities thereof become low to ensure the favorable workability; however, catalysts other than the double metal cyanide complex catalysts may also be used.

Additionally, the main chain skeleton of the oxyalkylene polymer can also be obtained by subjecting a hydroxyl group-terminated oxyalkylene polymer to a chain elongation with a difunctional or higher alkyl halide such as $CH_2Cl_2$ and $CH_2Br_2$, in the presence of a basic compound such as KOH, NaOH, $KOCH_3$ or $NaOCH_3$.

The molecular weight of the oxyalkylene polymer is preferably 15,000 to 50,000 in terms of the number average molecular weight, based on GPC, relative to polystyrene standard. When the number average molecular weight is less than 15,000, unpreferably those components having no reactive silicon groups introduced thereinto bleed from the cured product, similarly to the plasticizers and the like, to cause staining around the cured product, and the cured product of the obtained reactive silicon group-containing oxyalkylene polymer become brittle. When the number average molecular weight exceeds 50,000, unpreferably the oxyalkylene polymer becomes too high in viscosity to make the handling thereof difficult. The number average molecular weight is more preferably 17,000 to 40,000, and particularly preferably 20,000 to 30,000 for the purpose of ensuring the anti-staining property, attaining the mechanical properties and ensuring the workability.

The Mw/Mn value of the oxyalkylene polymer is preferably 1.6 or less. When the Mw/Mn value exceeds 1.6, the viscosity of the oxyalkylene polymer unpreferably becomes too high to make the handling thereof difficult. The Mw/Mn value concerned is preferably 1.5 or less, and particularly preferably 1.4 or less for the purpose of ensuring the workability.

No particular constraint is imposed on the reactive groups of the polyoxyalkylene polymer as the component (A). Typical examples of such reactive groups, however, may include an alkenyl group, a hydroxyl group and an isocyanate group. No particular constraint is imposed on the alkenyl group; typical examples of the alkenyl group may include the groups represented by the general formulas (1) and (2):

$$H_2C=C(R^1)— \quad (1)$$

$$HC(R^1)=CH— \quad (2)$$

wherein $R^1$ is a hydrogen atom or a hydrocarbon group having 10 or less carbon atoms.

As the production method of the polyoxyalkylene polymer having, at the terminals thereof, the alkenyl groups represented by the general formulas (1) and (2), methods well known in the art may be used; examples of such methods may include a method in which a hydroxyl group-terminated polyoxyalkylene polymer is reacted with a compound having an alkenyl bond to make bonds with the compound through ether bonds, ester bonds, urethane bonds, carbonate bonds and the like.

For example, when the alkenyl groups are introduced through ether bonds, there can be cited a method in which the terminal hydroxyl groups of the polyoxyalkylene polymer each are subjected to metal-oxidation to be —OM (M is Na, K or the like), and thereafter, the thus modified polyoxyalkylene polymer is reacted with an alkenyl group-containing compound represented by the following general formula (3):

$$H_2C=C(R^1)—R^2—X^1 \quad (3)$$

or the general formula (4):

$$HC(R^1)=CH—R^2—X^1 \quad (4)$$

wherein $R^1$ is the same as above; $R^2$ is a divalent organic group having 1 to 20 carbon atoms; and $X^1$ is a halogen atom.

Specific examples of the alkenyl-containing compound represented by the general formula (3) or (4) may include: $H_2C=CH—CH_2—Cl$, $H_2C=CH—CH_2—Br$, $H_2C=C(CH_3)—CH_2—Cl$, $H_2C=C(CH_3)—CH_2—Br$, $H_2C=C$ (CH$_2$CH$_3$)—CH$_2$—Cl, H$_2$C=C(CH$_2$CH$_3$)—CH$_2$—Br, H$_2$C=C(CH$_2$CH(CH$_3$)$_2$)—CH$_2$—Cl, H$_2$C=C(CH$_2$CH(CH$_3$)$_2$)—CH$_2$—Br, HC(CH$_3$)=CH—CH$_2$—Cl and HC(CH$_3$)=CH—CH$_2$—Br; wherein H$_2$C=CH—CH$_2$—Cl and H$_2$C=C(CH$_3$)—CH$_2$—Cl are particularly preferable.

In the method for introducing the alkenyl groups, isocyanate compounds, carboxylic acids and epoxy compounds having the H$_2$C=C(CH$_3$)—CH$_2$— group or the HC(CH$_3$)=CH—CH$_2$— group may also be used, in addition to the above compounds.

As the production method of the polyoxyalkylene polymer having isocyanate groups at the terminals thereof, methods well known in the art may be used; examples of such methods may include methods in each of which a hydroxyl group-terminated polyoxyalkylene polymer is reacted with an aliphatic, alicyclic, aromatic-aliphatic or aromatic isocyanate compound.

For the organic compound, as the component (B), of the present invention, having in the molecule thereof one or more reactive silicon groups and a functional group capable of reacting with the reactive groups of the component (A), those compounds each having the above described functional group can be used without any particular constraint. For example, when the component (A) has alkenyl groups, examples of the component (B) may include compounds each having a mercapto group and one or more reactive silicon groups, and compounds each having a hydrosilyl group represented by the following general formula and one or more reactive silicon groups:

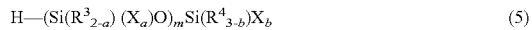

$$H—(Si(R^3_{2-a})(X_a)O)_mSi(R^4_{3-b})X_b \quad (5)$$

wherein $R^3$ and $R^4$ represent the same or different alkyl groups having 1 to 20 carbon atoms, aryl groups having 6 to 20 carbon atoms, aralkyl groups having 7 to 20 carbon atoms, or triorganosiloxy groups represented by (R')$_3$SiO—, and when two or more $R^3$ or $R^4$ are present, they may be the same or different; herein, R' is a monovalent hydrocarbon group having 1 to 20 carbon atoms, and the three R' groups may be the same or different; X represents a hydroxyl group or a hydrolyzable group, and when two or more Xs are present, they may be the same or different; b represents 0, 1, 2 or 3; a represents 0, 1, or 2; the a values in all m of the —Si(R$^3_{2-a}$)(X$_a$)— groups may be the same or different, and m represents an integer of 0 to 19, with the proviso that the relation b+Σa≧1 is satisfied. No particular constraint is imposed on the hydrolyzable group as X described above, and any hydrolyzable groups well known in the art may be used. Specific examples of such hydrolyzable groups may include: a hydrogen atom, a halogen atom, an alkoxy group, an acyloxy group, a ketoximate group, an amino group, an amide group, an acid amide group, an aminooxy group, a mercapto group and an alkenyloxy group. Among these groups, alkoxy groups such as a methoxy group, an ethoxy group, a propoxy group and an isopropoxy group are preferable because of the moderate hydrolyzability and easy handlability. To one silicon atom, 1 to 3 of the hydroxy and hydrolyzable groups can be bonded, and (b+Σa) is preferably 1 to 5. When two or more hydroxyl groups or hydrolyzable groups are present in a reactive silicon-containing group, those groups may be the same or different.

Specific examples of the compound represented by the general formula (5) may include: halogenated silanes such as trichlorsilane, methyldichlorsilane, dimethylchlorsilane, phenyldichlorsilane, trimethylsiloxymethylchlorsilane and 1,1,3,3-tetramethyl-1-bromodisiloxane; alkoxysilanes such as trimethoxysilane, triethoxysilane, methyldiethoxysilane, methyldimethoxysilane, phenyldimethoxysilane, trimethylsiloxymethylmethoxysilane and trimehtylsiloxydiethoxysilane; acyloxysilanes such as methyldiacetoxysilane, phenyldiacetoxysilane, triacetoxysilane, trimethylsiloxymethylacetoxysilane and trimethylsiloxydiacetoxysilane; ketoximatesilanes such as bis(dimethylketoximate)methylsilane, bis(cyclohexylketoximate)methylsilane, bis(diethylketoximate)trimethylsiloxysilane, bis(methylethylketoximate)methylsilane and tris(acetoximate) silane; and alkenyloxysilanes such as methylisopropenyloxysilane. Among these, the alkoxy silanes are particularly preferable, and among the alkoxy groups, the methoxy group is particularly preferable.

Also, in the present invention, each of the hydrolyzable groups X in the obtained terminal silyl groups can be converted into another hydrolyzable group Y. In particular, when X is a halogen atom, hydrogen halide having strong irritating odor is generated in curing with moisture, and accordingly it is preferable to convert such an X group into another hydrolyzable group. Examples of the hydrolyzable functional group which can be adopted in such conversion may include an alkoxy group, an acyloxy group, a ketoximate group, an amide group, an acid amide group, an aminooxy group and a mercapto group. Various methods for converting the halogen functional groups into these hydrolyzable groups may be cited. For example, specific examples of the methods for conversion into an alkoxy group may include the methods in which a halogen functional group is reacted with the following sets of compounds: (1) alcohols and phenols such as methanol, ethanol, 2-methoxyethanol, sec-butanol, t-butanol and phenol; (2) sodium alkoxide, potassium alkoxide, lithium alkoxide, and the like of alcohols and phenols; (3) orthoformates such as methyl orthoformate and ethyl orthoformate; and (4) epoxy compounds such as ethylene oxide, propylene oxide and allyl glycidyl ether. In particular, the reactions concerned can be easily carried out, to yield satisfactory results, by use of a reaction system based on a combination of (1) and (3) composed of alcohols, phenols and orthoformates, and a reaction system based on a combination of (1) and (4) composed of alcohols, phenols and epoxy compounds. Similarly, specific examples of the methods for conversion into an acyloxy group may include the methods in which a halogen functional group is reacted with carboxylic acids such as acetic acid and propionic acid; acid anhydrides such as acetic anhydride; and sodium salts, potassium salts and lithium salts of carboxylic acids. Similarly, specific examples of the methods for conversion into an aminooxy group may include the methods in which a halogen functional group is reacted with hydroxylamines such as N,N-dimethylhydroxylamine, N,N-diethylhydroxylamine, N,N-methylphenylhydroxylamine and N-hydroxylpyrrolidine; and sodium salts, potassium salts and lithium salts of hydroxylamines. Similarly, specific examples of the methods for conversion into an amide group may include the methods in which a halogen functional group is reacted with primary and secondary amines such as N,N-dimethylamine, N,N-diethylamine, N-methylphenylamine and pyrrolidine; and sodium salts, potassium salts and lithium salts of primary and secondary amines. Similarly, specific examples of the methods for conversion into an acid amide may include the methods in which a halogen functional group is reacted with acid amides having at least one hydrogen atom on the nitrogen atom such as acetamide, formamide and propionamide; and sodium salts, potassium salts and lithium salts of the aforementioned acid amides. The use of the reaction systems based on the combinations of ketoximes such as acetoxime and methyl ethyl ketoxime with orthoformates or epoxy compounds and the use of the reaction systems based on the combinations of mercaptans such as N-octylmercaptan and t-butylmercaptan with orthoformates or epoxy compounds respectively can result in a partial conversion into ketoximate groups and a partial conversion into mercapto groups, and the remaining parts can be converted into alkoxyl groups derived from the orthoformates or the epoxy compounds. The polymer concerned can be used after not only the halogen functional groups are converted into other hydrolyzable functional groups as described above, but also various hydrolyzable functional groups are converted into other hydrolyzable functional groups.

No particular constraint is imposed on the method in which the polyoxyalkylene polymer (A) having alkenyl groups as reactive groups is reacted with the organic compound (B) having one hydrosilyl group and one or more reactive silicon groups, and various methods can be applied. Particularly preferable is a method in which the reaction is carried out in the presence of a group VIII transition metal catalyst.

As the group VIII transition metal catalyst, effectively used is the complex catalyst of a metal selected from the group VIII transition metals such as platinum, rhodium, cobalt, palladium and nickel. For example, there may be used compounds such as $H_2PtCl_6 \cdot 6H_2O$, a platinum-vinylsiloxane complex, a platinum-olefin complex, Pt metal, $RhCl(PPh_3)_3$, $RhCl_3$, $Rh/Al_2O_3$, $RuCl_3$, $IrCl_3$, $FeCl_3$, $PdCl_2 \cdot 2H_2O$ and $NiCl_2$; however, the group VIII transition metal catalyst is particularly preferably any one of $H_2PtCl_6 \cdot 6H_2O$, a platinum-vinylsiloxane complex, a platinum-olefin complex from the viewpoint of the hydrosilylation reactivity.

The hydrosilylation reaction is favorably carried out within a temperature range usually from 10 to 150° C., preferably from 20 to 120° C., and more preferably from 40 to 100° C.; according to the needs such as the adjustment of the reaction temperature and the adjustment of the viscosity of the reaction system, there may be used solvents such as benzene, toluene, xylene, tetrahydrofuran, methylene chloride, pentane, hexane and heptane.

As the catalyst for the hydrosilylation reaction, $AlCl_3$, $TiCl_4$ and the like may also be used in addition to the aforementioned ones.

No particular constraint is imposed on the used amount of the catalyst; however, it is usually preferable to use $10^1$ to $10^8$ mol of a platinum catalyst per one mol of the alkenyl group, and more preferably the platinum catalyst may be used within a range from $10^3$ to $10^6$ mol. When the amount of the catalyst is small, there is a possibility that the hydrosilylation reaction does not proceed to a sufficient extent. Also, when the amount of the catalyst is too large, there are problems involving the cost rise due to the consumption of the catalyst and the increase of the residual amount of the catalyst in the products.

For the purpose of accelerating the hydrosilylation reaction, there may be used methods based on the reactivation of the catalyst by use of oxygen (Japanese Patent Laid-Open No. 8-283339), the addition of sulfur or the like.

Also, for the purpose of suppressing the oxidation, due to oxygen, of the oxyalkylene polymer, the reaction solvent and the like in the hydrosilylation reaction, the hydrosilylation reaction may be carried out in the presence of an antioxidant.

Specific examples of the compound having a mercapto group and one or more reactive silicon groups in the molecule thereof may include: γ-mercaptopropyltrimethoxysilane, γ-mercaptopropyltriethoxysilane, γ-mercaptopropylmethyldimethoxysilane and γ-mercaptopropylmethyldiethoxysilane. However, the compound concerned is not particularly limited to these examples.

No particular constraint is imposed on the method in which the polyoxyalkylene polymer (A) having alkenyl groups as reactive groups is reacted with the organic compound (B) having a mercapto group and one or more reactive silicon groups, and various methods can be applied.

When the component (A) has hydroxyl groups as the reactive groups, an organic compound having, for example, an isocyanate group as a functional group capable of reacting with the component (A) and other compounds may be cited as the component (B). Examples of such a compound may include: γ-isocyanatepropyltrimethoxysilane, γ-isocyanatepropylmethyldimethoxysilane γ-isocyanatepropyltriethoxysilane and γ-isocyanatepropylmethyldiethoxysilane. However, the compound concerned is not limited to these examples.

No particular constraint is imposed on the method in which the polyoxyalkylene polymer (A) having hydroxyl groups as the reactive groups is reacted with the organic compound (B) having an isocyanate group and one or more reactive silicon groups, and various methods can be applied.

When the component (A) has isocyanate groups as the reactive groups, an organic compound having, for example, an amino group as a functional group capable of reacting with the component (A) and other compounds may be cited as the component (B). Examples of such a compound may include: γ-aminopropyltrimethoxysilane, γ-aminopropyltriethoxysilane, γ-aminopropylmethyldimethoxysilane, γ-aminopropylmethyldiethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl)aminopropylmethyldiethoxysilane, γ-ureidopropyltrimethoxysilane, N-phenyl-γ-aminopropyltrimethoxysilane, N-benzyl-γ-aminopropyltrimethoxysilane, N-vinylbenzyl-γ-aminopropyltriethoxysilane, N-phenyl-γ-aminopropylmethyldimethoxysilane, N-(n-butyl)-γ-aminopropyltrimethoxysilane, N-(n-butyl)-γ-aminopropylmethyldimethoxysilane, N-ethylaminoisobutyltrimethoxysilane, N-methylaminopropylmethyldimethoxysilane, N-methylaminopropyltrimethoxysilane and bis(trimethoxysilylpropyl)amine. However, the compound concerned is not limited to these examples.

No particular constraint is imposed on the method in which the polyoxyalkylene polymer (A) having isocyanate groups as the reactive groups is reacted with the organic compound (B) having an amino group and one or more reactive silicon groups, and various methods can be applied.

As the method for introducing reactive silicon groups into the polyoxyalkylene polymer (A), preferable is a method in which a polyoxyalkylene polymer, as the component (A), having alkenyl groups is reacted with a compound, as the component (B), having a hydrosilyl group in the molecule thereof, because the viscosity of the thus obtained, reactive silicon group-containing polyoxyalkylene polymer becomes relatively low.

There are several possible methods for measuring the introduction rate of the reactive silicon group. At present, accurate values can be obtained, on the basis of the $^1H$ NMR spectra, from comparison of the integrated values for the terminals having the reactive silicon groups with the integrated values of the terminals having no reactive silicon groups.

When the organic compound, having one or more reactive silicon groups and a functional group capable of reacting with the reactive groups in the polyoxyalkylene polymer (A), is reacted with a polyoxyalkylene polymer (A) having a molecular weight distribution of 1.6 or less, a number average molecular weight of 15,000 to 50,000, and 0.8 or more of reactive groups, on average, per molecule thereof, the proportion of the organic compound is preferably 0.8 to 1.5 molecules thereof, on average, per molecule of the component (A). When the proportion is less than 0.8 molecule, the amount of the polyoxyalkylene polymers, having no reactive silicon groups introduced thereinto and providing the cause for staining, is increased, while when the proportion exceeds 1.5 molecules, the cured product obtained unpreferably exhibit high modulus and low elongation. The amount of the component (B) to be reacted with one molecule of the component (A) is preferably 1.0 to 1.4 molecules of the component (B); it is particularly preferably 1.0 to 1.3 molecules because the curability and the mechanical properties as a sealant can be ensured, and the amount of the polyoxyalkylene polymers, having no reactive silicon groups introduced thereinto and providing the cause for staining, can be decreased.

Also, in the present invention, there may be used a modified polymer of the reactive silicon group-containing polyoxyalkylene polymer which is obtained by reacting the polyoxyalkylene polymer (A) having a molecular weight distribution of 1.6 or less, a number average molecular weight of 15,000 to 50,000, and 0.8 or more of reactive groups, on average, per molecule thereof with the organic compound (B) having in the molecule thereof one or more reactive silicon groups and a functional group capable of reacting with the reactive groups of (A) in a proportion of 0.8 to 1.5 molecules of the organic compound (B), on average, per molecule of the component (A).

Among the typical modified polymers is a polymer which is obtained, in the presence of a polyoxyalkylene polymer having the reactive silicon groups, by polymerizing a mixture composed of an alkyl (meth)acrylate monomer represented by the following general formula (6) and containing an alkyl group having 1 to 8 carbon atoms and/or alkyl (meth)acrylate monomer represented by the following general formula (7) and containing an alkyl group having 10 or more carbon atoms and/or an alkyl (meth)acrylate monomer represented by the following general formula (8) and containing a reactive silicon group. In addition to this modified polymer, the blends in which the polymers of (6), (7) and (8) are blended with the reactive silicon group-containing oxyalkylene polymer may also be used:

   (6)

wherein $R^5$ represents a hydrogen atom or a methyl group, and $R^6$ represents an alkyl group having 1 to 8 carbon atoms;

   (7)

wherein $R^5$ is the same as above, and $R^7$ represents an alkyl group having 10 or more carbon atoms; and

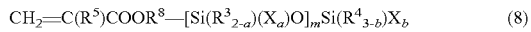   (8)

wherein $R^5$ is the same as above, $R^8$ represents a divalent alkylene group having 1 to 6 carbon atoms, and $R^3$, $R^4$, X, a, b and m are the same as described above.

Examples of $R^6$ in the above general formula (6) may include alkyl groups having 1 to 8 carbon atoms, preferably 1 to 4 carbon atoms, and more preferably 1 or 2 carbon atoms, such as a methyl group, an ethyl group, a propyl group, a n-butyl group, a t-butyl group and a 2-ethylhexyl group. The monomers represented by the general formula (6) may be used each alone or in combinations of two or more thereof.

Examples of $R^7$ in the above general formula (7) may include long-chain alkyl groups having 10 or more carbon atoms, usually 10 to 30 carbon atoms, and preferably 10 to 20 carbon atoms, such as a lauryl group, a tridecyl group, a cetyl group, a stearyl group and a biphenyl group. The monomers represented by the general formula (7) may be used each alone or in combinations of two or more thereof.

Examples of $R^8$ in the above general formula (8) may include groups having 1 to 6 carbon atoms and preferably 1 to 4 carbon atoms, such as a methylene group, an ethylene group and a propylene group. Examples of the reactive silicon groups to be bonded to $R^8$ may include a trimethoxysilyl group, a methyldimethoxysilyl group, a triethoxysilyl group and a methyldiethoxysilyl group. The monomers represented by the general formula (8) may be used each alone or in combinations of two or more thereof.

In the above polymerization, monomers other than those represented by formulas (6), (7) and (8) may be concomitantly used. Examples of such monomers may include: acrylic acids such as acrylic acid and methacrylic acid; amide group-containing monomers such as acrylamide, methacrylamide, N-methylolacrylamide and N-methylolmethacrylamide; epoxy group-containing monomers such as glycidyl acrylate and glycidyl methacrylate; amino group-containing monomers such as diethylaminoethyl acrylate, diethylaminoethyl methacrylate and aminoethyl vinyl ether; and monomers such as acrylonitrile, styrene, α-methylstyrene, alkyl vinyl ether, vinyl chloride, vinyl acetate, vinyl propionate and ethylene. In this case, the ratio of the total amount of the polymerized monomers of formulas (6), (7) and (8) to the total amount of the polymerized monomers is preferably 50% or more, and particularly preferably 70 wt % or more.

When the content of a component of the liquid components included in the curable composition of the present invention having at least one reactive silicon group is represented by x (wt%) and the content of a component of the same liquid components described above having no reactive silicon groups is represented by y (wt%), it is preferable that the ratio y/x is 0.4, there is a fear that uncrosslinked liquid component bleeds from the cured product to provide a cause for staining. The ratio y/x is more preferably 0.3 or less; it is particularly preferably 0.2 or less for the purpose of ensuring the anti-staining property. The ratio y/x of 0.1 or more is preferable for the purpose of ensuring the mechanical properties, with the proviso that x+y=100. Herein, the component having at least one reactive silicon group means a polyoxyalkylene polymer into which one or more reactive silicon groups are introduced when the component (A) is reacted with the component (B), while the component having no reactive silicon groups means a polyoxyalkylene polymer having no reactive silicon groups introduced when the component (A) is reacted with the component (B), and in the case where the curable composition of the present invention contains a plasticizer, it includes the plasticizer component and the polyoxyalkylene polymer having no reactive silicon groups.

According to need, a plasticizer may be added to the curable composition of the present invention.

Specific examples of the plasticizer may include: phthalates such as dioctyl phthalate and diisodecyl phthalate; aliphatic dibasic acid esters such as dioctyl adipate; epoxidized plasticizers such as epoxidized soybean oil and epoxidized flaxseed oil; polyethers such as polypropylene glycol and the derivatives thereof; and vinyl polymers obtained by polymerizing vinyl monomers by means of various methods. These plasticizers may be used each alone or in combinations of two or more thereof.

The used amount of a plasticizer is preferably 10 parts by weight or less in relation to 100 parts by weight of the reactive silicon group-containing polyoxyalkylene polymer obtained by reacting the component (A) with the component (B). When the used amount exceeds 10 parts by weight, there is a fear that the plasticizer bleeds from the obtained cured product to provide a cause for staining. The used amount is preferably 5 parts by weight or less, and more preferably 2 parts by weight or less; for the purpose of ensuring the anti-staining property, it is particularly preferable that no plasticizers are added. It may be noted that the curable composition of the present invention can ensure a sufficient workability even when no plasticizers are added thereto because the reactive silicon group-containing polyoxyalkylene polymer is low in viscosity.

The filler (C) of the present invention is not limited to any specific fillers. Specific examples of the filler (C) may include: reinforcing fillers such as fumed silica, precipitated silica, silicic anhydride, hydrous silicic acid and carbon black; fillers such as calcium carbonate, magnesium carbonate, diatomite, calcined clay, clay, talc, titanium oxide, bentonite, organic bentonite, ferric oxide, zinc oxide, active zinc white, and organic fillers including hydrogenated castor oil, PVC and polyolefin; fibrous fillers such as asbestos, glass fiber and glass filament; inorganic balloons and organic balloons such as shirasu balloon, glass balloon, Saran balloon and phenolic balloon; one or more of these fillers may be used according to need. It is preferable that the used amount of the filler(s) is preferably 1 to 200 parts by weight, and particularly preferably 5 to 200 parts by weight in relation to 100 parts by weight of the reactive silicon group-containing polyoxyalkylene polymer obtained by reacting the component (A) with the component (B).

No particular constraint is imposed on the curing catalyst (D) in the present invention, as long as it is the curing catalyst capable of accelerating the reaction of the reactive groups of the reactive silicon group-containing polyoxyalkylene polymer obtained by reacting the component (A) and the component (B), in the curable composition, with each other. Specific examples of the curing catalyst (D) may include: titanium esters such as tetrabutyl titanate and tetrapropyl titanate; organotin compounds such as dibutyltin diacetylacetonate, dibutyltin dilaurate, dibutyltin maleate, dibutyltin diacetate, tin octylate and tin naphthenate; lead octylate; amine compounds such as butylamine, octylamine, dibutylamine, monoethanolamine, diethanolamine, triethanolamine, diethylenetriamine, triethylenetetramine, oleylamine, octylamine, cyclohexylamine, banzylamine, diethylaminopropylamine, xylylenediamine, triethylenediamine, guanidine, diphenylguanidine, 2,4,6-tris(dimethylaminomethyl)phenol, morpholine, N-methylmorpholine and 1,3-diazabicyclo(5,4,6) undecene-7 (DBU), and salts of these amines with carboxylic acids and the like; low molecular weight polyamide resins obtained from excessive polyamines and polybasic acids; reaction products between excessive polyamines and epoxy compounds; amino group-containing silane coupling agents such as silanol condensation catalysts well known in the art including γ-aminopropyltrimethoxysilane and N-(β-aminoethyl)aminopropylmethyldimethoxysilane. One or more of these curing catalysts may be used according to need. The used amount of the curing catalyst(s) is preferably approximately 0.1 to 20 parts by weight, and more preferably 1 to 10 parts by weight in relation to 100 parts by weight of the reactive silicon group-containing polyoxyalkylene polymer obtained by reacting the component (A) with the component (B).

To the curable composition of the present invention, adhesion-imparting agents, solvents or other additives may be added according to need.

Examples of the adhesion-imparting agents may include: amino group-containing silanes such as γ-aminopropyltrimethoxysilane, γ-aminopropylmethyldimethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-ureidopropyltriethoxysilane, N-β-(N-vinylbenzylaminoethyl)-γ-aminopropyltrimethoxysilane and γ-anilinopropyltrimethoxysilane; mercapto group-containing silanes such as γ-mercaptopropyltrimethoxysilane, γ-mercaptopropyltriethoxysilane, γ-mercaptopropylmethyldimethoxysilane and γ-mercaptopropylmethyldiethoxysilane; epoxy group-containing silanes such as γ-glycidoxypropyltrimethoxysilane, γ-glycidoxypropylmethyldimethoxysilane, γ-glycidoxypropyltriethoxysilane and β-(3,4-epoxycyclohexyl)ethyltrimethoxysilane; carboxysilanes such as β-carboxylethylphenylbis(2-methoxyethoxy)silane and N-β-(N-carboxylmethylaminoethyl)-γ-aminopropyltrimethoxysilane; and ketiminated silanes obtained by dehydration condensation between amino group-containing silanes and various ketones. These adhesion-imparting agents may be used each alone or in combinations of two or more thereof.

Examples of the solvents may include nonreactive solvents such as hydrocarbons, acetates, alcohols, ethers and ketones. No particular constraint is imposed on the solvents as long as they are such solvents as described above.

Examples of other additives may include: antisagging agents such as hydrogenated castor oil, organic bentonite and calcium stearate; colorants; antioxidants; ultraviolet absorbers; and photostabilizers. Additives such as adhesion improvers, physical property adjusters, storage stability improvers, lubricants, pigments and foaming agents may also be added optionally according to need.

No particular constraint is imposed on the method for producing the curable composition of the present invention which includes the reactive silicon group-containing polyoxyalkylene polymer obtained by reacting the component (A) and the component (B) with each other, the component (C) and the component (D); there may be adopted common methods such as, for example, a method in which the above described components are combined and kneaded with a mixer, roll, kneader or the like, and a method in which the individual components are dissolved by use of a solvent and mixed together. The composition concerned may also be prepared as either a one-component composition or a two-component composition.

EXAMPLES

The curable composition of the present invention will be described below with reference to Examples. The present invention will be specifically described below with reference to Synthesis Examples and Examples, but the present invention is neither limited to these Synthesis Examples nor to these Examples.

Synthesis Example 1

Propylene oxide was polymerized by use of a polyoxypropylene diol having a number average molecular weight of 2000 as initiator and a double metal cyanide complex as catalyst, to yield a polyoxypropylene diol which has a number average molecular weight of 30200 (as measured by GPC, relative to polystyrene standard) and a molecular weight distribution of 1.2. To this product, 2 parts by weight of a 30% methanol solution of sodium methylate was added, and thereafter devolatilization was carried out at 130° C. under reduced pressure until no methanol was recovered. Subsequently, 1.3 parts by weight of allyl chloride was added and the reaction mixture was allowed to react for 5 hours. Thereafter, the unreacted allyl chloride was removed by devolatilization under reduced pressure, and then the reaction product was purified with hexane and water to yield a polyoxyalkylene polymer (P1) having approximately 2 allyl terminal groups per molecule of the polymer.

Synthesis Example 2

Propylene oxide was polymerized by use of a polyoxypropylene diol having a number average molecular weight of 2000 as initiator and a double metal cyanide complex as catalyst, to yield a polyoxypropylene diol which has a number average molecular weight of 30200 (as measured by GPC, relative to polystyrene standard) and a molecular weight distribution of 1.2. To this product, 2 parts by weight of a 30% methanol solution of sodium methylate was added, and thereafter devolatilization was carried out at 130° C. under reduced pressure until no methanol was recovered. Subsequently, 1.6 parts by weight of methallyl chloride was added and the reaction mixture was allowed to react for 5 hours. Thereafter, the unreacted methallyl chloride was removed by devolatilization under reduced pressure, and then the reaction product was purified with hexane and water to yield a polyoxyalkylene polymer (P2) having approximately 2 methallyl terminal groups per molecule of the polymer.

Synthesis Example 3

Propylene oxide was polymerized by use of a polyoxypropylene diol having a number average molecular weight of 2000 as initiator and a double metal cyanide complex as catalyst, to yield a polyoxypropylene diol which has a number average molecular weight of 20500 (as measured by GPC, relative to polystyrene standard) and a molecular weight distribution of 1.2. To this product, 2.5 parts by weight of a 30% methanol solution of sodium methylate was added, and thereafter devolatilization was carried out at 130° C. under reduced pressure until no methanol was recovered. Subsequently, 1.5 parts by weight of allyl chloride was added and the reaction mixture was allowed to react for 5 hours. Thereafter, the unreacted allyl chloride was removed by devolatilization under reduced pressure, and then the reaction product was purified with hexane and water to yield a polyoxyalkylene polymer (P3) having approximately 2 allyl terminal groups per molecule of the polymer.

Synthesis Example 4

Propylene oxide was polymerized by use of a polyoxypropylene diol having a number average molecular weight of 2000 as initiator and a double metal cyanide complex as catalyst, to yield a polyoxypropylene diol which has a number average molecular weight of 14300 (as measured by GPC, relative to polystyrene standard) and a molecular weight distribution of 1.1. To this product, 4.2 parts by weight of a 30% methanol solution of sodium methylate was added, and thereafter devolatilization was carried out at 130° C. under reduced pressure until no methanol was recovered. Subsequently, 2.8 parts by weight of allyl chloride was added and the reaction mixture was allowed to react for 5 hours. Thereafter, the unreacted allyl chloride was removed by devolatilization under reduced pressure, and then the reaction product was purified with hexane and water to yield a polyoxyalkylene polymer (P4) having approximately 2 allyl terminal groups per molecule of the polymer.

Synthesis Example 5

To a polyoxypropylene diol having a number average molecular weight of 3000, 11.4 parts by weight of a 30% methanol solution of sodium methylate was added, and thereafter devolatilization was carried out at 130° C. under reduced pressure until no methanol was recovered. Then, 2 parts by weight of dichlormethane was added, the reaction mixture was allowed to react for 5 hours, and then the unreacted dichlormethane was removed by devolatilization under reduced pressure. Then, 4 parts by weight of the 30% methanol solution of sodium methylate was added, and then devolatilization was carried out at 130° C. under reduced pressure until no methanol was recovered. Then, 2.5 parts by weight of allyl chloride was added, and the reaction mixture was allowed to react for 5 hours. Thereafter, the unreacted allyl chloride was removed by devolatilization under reduced pressure, and then the reaction product was purified with hexane and water to yield a polyoxyalkylene polymer (P5) having approximately 2 allyl terminal groups per molecule of the polymer, a number average molecular weight of 17000 (as measured by GPC, relative to polystyrene standard) and a molecular weight distribution of 2.0.

Synthesis Example 6

In the presence of chloroplatinic acid, P1 obtained in Synthesis Example 1 was reacted with 0.37 mol of dimethoxymethylsilane in relation to 1 mol of the allyl groups in P1, to yield a polyoxyalkylene polymer (P6) having dimethoxymethylsilyl groups at the terminals thereof.

Synthesis Example 7

In the presence of chloroplatinic acid, P1 obtained in Synthesis Example 1 was reacted with 0.5 mol of dimethoxymethylsilane in relation to 1 mol of the allyl groups in P1, to yield a polyoxyalkylene polymer (P7) having dimethoxymethylsilyl groups at the terminals thereof.

Synthesis Example 8

In the presence of chloroplatinic acid, P1 obtained in Synthesis Example 1 was reacted with 0.6 mol of dimethoxymethylsilane in relation to 1 mol of the allyl groups in P1, to yield a polyoxyalkylene polymer (P8) having dimethoxymethylsilyl groups at the terminals thereof.

Synthesis Example 9

In the presence of chloroplatinic acid, P1 obtained in Synthesis Example 1 was reacted with 0.7 mol of dimethoxymethylsilane in relation to 1 mol of the allyl groups in P1, to yield a polyoxyalkylene polymer (P9) having dimethoxymethylsilyl groups at the terminals thereof.

Synthesis Example 10

In the presence of chloroplatinic acid, P1 obtained in Synthesis Example 1 was reacted with 0.8 mol of dimethoxymethylsilane in relation to 1 mol of the allyl groups in P1, to yield a polyoxyalkylene polymer (P10) having dimethoxymethylsilyl groups at the terminals thereof.

Synthesis Example 11

In the presence of chloroplatinic acid, P2 obtained in Synthesis Example 2 was reacted with 0.98 mol of dimethoxymethylsilane in relation to 1 mol of the methallyl groups in P2, to yield a polyoxyalkylene polymer (P11) having dimethoxymethylsilyl groups at the terminals thereof.

Synthesis Example 12

In the presence of chloroplatinic acid, P3 obtained in Synthesis Example 3 was reacted with 0.6 mol of dimethoxymethylsilane in relation to 1 mol of the allyl groups in P3, to yield a polyoxyalkylene polymer (P12) having dimethoxymethylsilyl groups at the terminals thereof.

Synthesis Example 13

In the presence of chloroplatinic acid, P4 obtained in Synthesis Example 4 was reacted with 0.6 mol of dimethoxymethylsilane in relation to 1 mol of the allyl groups in P4, to yield a polyoxyalkylene polymer (P13) having dimethoxymethylsilyl groups at the terminals thereof.

Synthesis Example 14

In the presence of chloroplatinic acid, P4 obtained in Synthesis Example 4 was reacted with 0.8 mol of dimethoxymethylsilane in relation to 1 mol of the allyl groups in P4, to yield a polyoxyalkylene polymer (P14) having dimethoxymethylsilyl groups at the terminals thereof.

Synthesis Example 15

In the presence of chloroplatinic acid, P5 obtained in Synthesis Example 5 was reacted with 0.6 mol of dimethoxymethylsilane in relation to 1 mol of the allyl groups in P5, to yield a polyoxyalkylene polymer (P15) having dimethoxymethylsilyl groups at the terminals thereof.

Synthesis Example 16

Propylene oxide was polymerized by use of a polyoxypropylene diol having a number average molecular weight of 2000 as initiator and a double metal cyanide complex as catalyst, to yield a polyoxypropylene diol which has a number average molecular weight of 30200 (as measured by GPC, relative to polystyrene standard) and a molecular weight distribution of 1.2. The obtained polypropylene glycol was added with 0.6 mol of γ-isocyanatepropyltrimethoxysilane in relation to 1 mol of the hydroxyl groups of the obtained polypropylene glycol, and the reaction mixture was subjected to urethanation reaction to yield a polyoxyalkylene polymer (P16) having trimethoxysilyl groups at the terminals thereof.

Example 1

A curable composition was prepared by fully kneading a mixture composed of 120 parts by weight of P8 obtained in Synthesis Example 8 as the reactive silicon group-containing polyoxyalkylene polymer, 120 parts by weight of calcium carbonate as filler, 2 parts by weight of dibutyltin bisacetylacetonate as curing catalyst, 20 parts by weight of titanium oxide, 5 parts by weight of polyamide wax, 2 parts by weight of vinyltrimethoxysilane, and 3 parts by weight of N-(β-aminoethyl)-γ-aminopropyltrimethoxysilane. The following tests were carried out by use of the curable composition thus obtained.

Workability: The viscosity was measured at 23° C. with a BS type viscometer using a rotor No. 7 at a rotation speed of 2 rpm.

Dumbbell tensile test: A 3 mm thick sheet was prepared, which was cured by aging at 23° C. at a humidity of 60% for 3 days, further subjected to the aging at 50° C. in an oven for 4 days and then brought back to room temperature. Thereafter, a JIS No. 3 dumbbell was punched out from the sheet, and the modulus (M100) at the 100% elongation and the elongation at break thereof were measured at a tensile rate of 200 mm/min with AUTOGRAPH.

Staining of stone caused by bleeding: A joint in contact with a piece of natural marble was prepared, and the bleeding width of the liquid component from the sealant joint was measured.

Staining of paint: A 3 mm thick sheet was prepared, which was subjected to aging at 23° C. at a humidity of 60% for 1 day. Thereafter, an acryl emulsion paint was applied onto the surface of the sheet, and the sheet was further subjected to aging at 23° C. at a humidity of 60% for 1 day. Then, the sheet was exposed outdoors, and the dust adhesion onto the coated surface was subjected to a three grade evaluation.

Example 2

A curable composition was prepared in the same manner as in Example 1 except that 6 parts by weight of a polyoxypropylene diol having a number average molecular weight of 3000 was used as plasticizer. The evaluations of the obtained composition were carried out in the same manner as in Example 1.

Example 3

A curable composition was prepared in the same manner as in Example 1 except that 120 parts by weight of P12 obtained in Synthesis Example 12 was used as the reactive silicon group-containing polyoxyalkylene polymer. The evaluations of the obtained composition were carried out in the same manner as in Example 1.

Example 4

A curable composition was prepared in the same manner as in Example 1 except that 120 parts by weight of P7 obtained in Synthesis Example 7 was used as the reactive silicon group-containing polyoxyalkylene polymer. The evaluations of the obtained composition were carried out in the same manner as in Example 1.

Example 5

A curable composition was prepared in the same manner as in Example 1 except that 120 parts by weight of P9 obtained in Synthesis Example 9 was used as the reactive silicon group-containing polyoxyalkylene polymer. The evaluations of the obtained composition were carried out in the same manner as in Example 1.

Example 6

A curable composition was prepared in the same manner as in Example 1 except that 120 parts by weight of P16 obtained in Synthesis Example 16 was used as the reactive silicon group-containing polyoxyalkylene polymer. The evaluations of the obtained composition were carried out in the same manner as in Example 1.

Comparative Example 1

A curable composition was prepared in the same manner as in Example 1 except that 120 parts by weight of P11 obtained in Synthesis Example 11 was used as the reactive silicon group-containing polyoxyalkylene polymer, and 36 parts by weight of a polyoxypropylene diol having a number average molecular weight of 3000 was used as plasticizer. The evaluations of the obtained composition were carried out in the same manner as in Example 1.

Comparative Example 2

A curable composition was prepared in the same manner as in Example 1 except that 120 parts by weight of P6 obtained in Synthesis Example 6 was used as the reactive silicon group-containing polyoxyalkylene polymer. The evaluations of the obtained composition were carried out in the same manner as in Example 1.

Comparative Example 3

A curable composition was prepared in the same manner as in Example 1 except that 120 parts by weight of P10 obtained in Synthesis Example 10 was used as the reactive silicon group-containing polyoxyalkylene polymer. The evaluations of the obtained composition were carried out in the same manner as in Example 1.

Comparative Example 4

A curable composition was prepared in the same manner as in Example 1 except that 120 parts by weight of P13 obtained in Synthesis Example 13 was used as the reactive silicon group-containing polyoxyalkylene polymer. The evaluations of the obtained composition were carried out in the same manner as in Example 1.

Comparative Example 5

A curable composition was prepared in the same manner as in Example 1 except that 120 parts by weight of P14 obtained in Synthesis Example 14 was used as the reactive silicon group-containing polyoxyalkylene polymer. The evaluations of the obtained composition were carried out in the same manner as in Example 1.

Comparative Example 6

A curable composition was prepared in the same manner as in Example 1 except that 120 parts by weight of P15 obtained in Synthesis Example 15 was used as the reactive silicon group-containing polyoxyalkylene polymer. The evaluations of the obtained composition were carried out in the same manner as in Example 1.

The results thus obtained are shown in Table 1.

TABLE 1

|  | Ex. 1 | Ex. 2 | Ex. 3 | Ex. 4 | Ex. 5 | Ex. 6 |
| --- | --- | --- | --- | --- | --- | --- |
| Polymer | P8 | P8 | P12 | P7 | P9 | P16 |
| No. Av. mol. wt | 30200 | 30200 | 20500 | 30200 | 30200 | 30200 |
| Mol. wt distribution | 1.2 | 1.2 | 1.2 | 1.2 | 1.2 | 1.2 |
| No. of react. Si groups in one molecule of react. Si group-contng polyoxyalkylene polymer (Note 1) | 1.2 | 1.2 | 1.2 | 1.0 | 1.4 | 1.2 |
| Plasticizer (per 100 parts by weight of react. Si group-contng polyoxyalkylene polymer (Note 2) | — | 5 | — | — | — | — |
| y/x (Note 3) | 0.20 | 0.25 | 0.21 | 0.32 | 0.12 | 0.21 |
| M100 (MPa) | 0.38 | 0.36 | 0.40 | 0.30 | 0.48 | 0.44 |
| Elongation at break (%) | 920 | 940 | 800 | 1100 | 700 | 780 |
| Bleeding to natural marble after 2 months (mm) | <1 | <1 | <1 | 1 | <1 | <1 |
| Dust adhesion on the painted surface after 6 months | E | G | E | G | E | E |
| Viscosity (Pa·s) | 2020 | 1810 | 1840 | 1950 | 2050 | 2200 |
| Overall evaluation | E | E | E | G | G | G |

|  | Comp. ex. 1 | Comp. ex. 2 | Comp. ex. 3 | Comp. ex. 4 | Comp. ex. 5 | Comp. ex. 6 |
| --- | --- | --- | --- | --- | --- | --- |
| Polymer | P11 | P6 | P13 | P14 | P15 | P10 |
| No. Av. mol. wt | 30200 | 30200 | 30200 | 14300 | 14300 | 17000 |
| Mol. wt distribution | 1.2 | 1.2 | 1.2 | 1.1 | 1.1 | 2.0 |
| No. of react. Si groups in one molecule of react. Si group-contng polyoxyalkylene polymer (Note 1) | 1.96 | 0.74 | 1.6 | 1.2 | 1.6 | 1.2 |
| Plasticizer (per 100 parts by weight of react. Si group-contng polyoxyalkylene polymer (Note 2) | 30 | — | — | — | — | — |
| y/x (Note 3) | 0.33 | 0.63 | 0.04 | 0.18 | 0.05 | 0.19 |
| M100 (MPa) | 0.50 | 0.20 | 0.58 | 0.47 | 0.60 | 0.41 |

TABLE 1-continued

| | | | | | | |
|---|---|---|---|---|---|---|
| Elongation at break (%) | 680 | 1150 | 490 | 480 | 300 | 750 |
| Bleeding to natural marble after 2 months (mm) | 5 | 3 | <1 | 2 | <1 | 2 |
| Dust adhesion on the painted surface after 6 months | P | M | E | M | E | M |
| Viscosity (Pa · s) | 2050 | 2000 | 2100 | 1580 | 1620 | 2000 |
| Overall evaluation | P | P | P | P | P | P |

(Note 1)
Number of the reactive silicon groups in one molecule of the reactive silicon group-containing polyoxyalkylene.
(Note 2)
The parts by weight of the plasticizer in relation to 100 parts by weight of the reactive silicon group-containing polyoxyalkylene polymer.
(Note 3)
A mixture containing only the reactive silicon group-containing polyoxyalkylene polymer, a plasticizer and dibutyltin bisacetylacetonatewas cured, and the obtained cured product was subjected to aging at 23° C. for 3 days andfurther at 50° C. for 4 days. Thereafter, the cured product was soaked in acetone for 2 days, and the proportion of the uncrosslinkedcomponent (the component having absolutely no crosslinking silicon groups) was derived from the resulting weight change of the cured product.

As can be seen from the above descriptions, the curable composition of the present invention is satisfactory in workability, gives the cured product obtained therefrom satisfactory in anti-staining property, and has mechanical properties desirable for sealant.

INDUSTRIAL APPLICABILITY

The curable composition of the present invention can be effectively used as sealants for use in building construction providing suppressed staining around joints and also for other applications.

The invention claimed is:

1. A curable composition comprising a reactive silicon group-containing polyoxyalkylene polymer which is obtained by reacting a polyoxyalkylene polymer (A) having a molecular weight distribution of 1.6 or less, a number average molecular weight of 15,000 to 50,000, and 0.8 or more reactive groups, on average, per molecule thereof with an organic compound (B) having in the molecule thereof a reactive silicon group and a functional group capable of reacting with the reactive groups of the polymer (A) in a proportion of 0.8 to 1.5 molecules of the organic compound (B), on average, per molecule of the component (A);
   a filler (C);
   a curing catalyst (D); and
   a plasticizer in an amount of 0 to less than 2 parts by weight in relation to 100 parts by weight of the reactive silicon group-containing polyoxyalkylene polymer.

2. The curable composition according to claim 1, in which:
   in the liquid components of the curable composition according to claim 1, the ratio y/x of the content y (wt %) of a component having no reactive silicon groups to the content x (wt %) of a component having at least one reactive silicon group is 0.4 or less, with the proviso that x+y=100, wherein:
   the liquid component having no reactive silicon groups is a polyoxyalkylene polymer having no reactive silicon groups introduced when the component (A) and the component (B), both according to claim 1, are reacted with each other; and
   in the case where the curable composition according to claim 1 comprises a plasticizer, the liquid component having no reactive silicon groups includes the plasticizer component and the polyoxyalkylene polymer having no reactive silicon groups.

3. The curable composition according to claim 1, in which the reactive group of the component (A) is an alkenyl group, and the component (B) is an organic compound having a hydrosilyl group as a functional group capable of reacting with the component (A).

4. The curable composition according to claim 1, in which the reactive group of the component (A) is a hydroxyl group, and the component (B) is an organic compound having an isocyanate group as a functional group capable of reacting with the component (A).

5. The curable composition according to claim 1, in which the reactive group of the component (A) is an isocyanate group, and the component (B) is an organic compound having an amino group as a functional group capable of reacting with the component (A).

6. The curable composition according to claim 1, in which the reactive group of the component (A) is an alkenyl group, and the component (B) is an organic compound having a mercapto group as a functional group capable of reacting with the component (A).

7. The curable composition according to claim 2, in which the reactive group of the component (A) is an alkenyl group, and the component (B) is an organic compound having a hydrosilyl group as a functional group capable of reacting with the component (A).

8. The curable composition according to claim 2, in which the reactive group of the component (A) is a hydroxyl group, and the component (B) is an organic compound having an isocyanate group as a functional group capable of reacting with the component (A).

9. The curable composition according to claim 2, in which the reactive group of the component (A) is an isocyanate group, and the component (B) is an organic compound having an amino group as a functional group capable of reacting with the component (A).

10. The curable composition according to claim 2, in which the reactive group of the component (A) is an alkenyl group, and the component (B) is an organic compound having a mercapto group as a functional group capable of reacting with the component (A).

11. The curable composition according to claim 1, in which the plasticizer is at least one selected from the group consisting of phthalates; aliphatic dibasic acid esters; epoxidized plasticizers; polyethers; and vinyl polymers.

12. The curable composition according to claim 1, wherein no plasticizer is present.

* * * * *